UNITED STATES PATENT OFFICE.

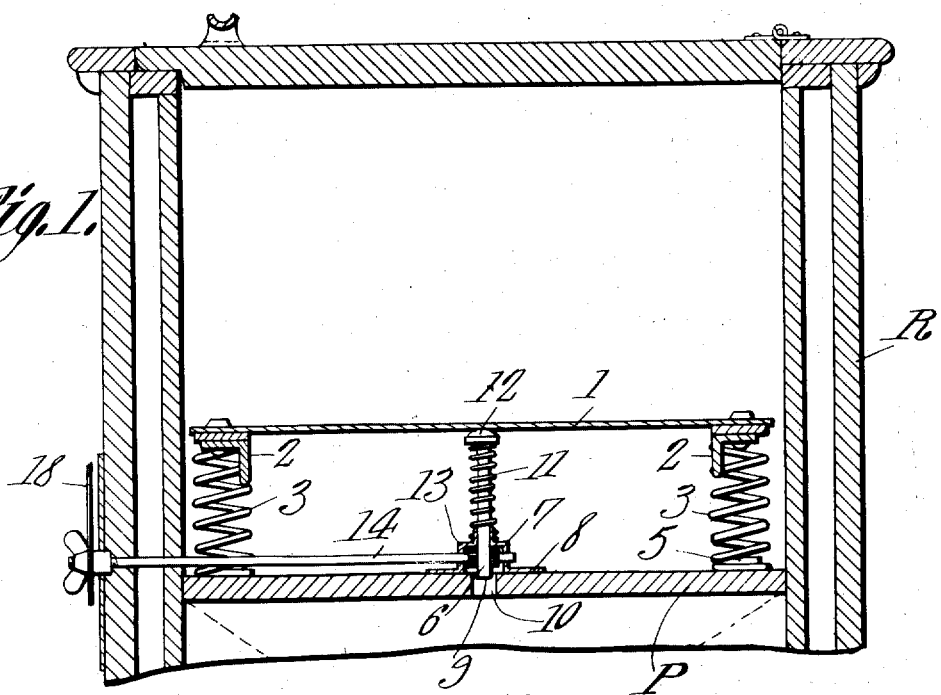
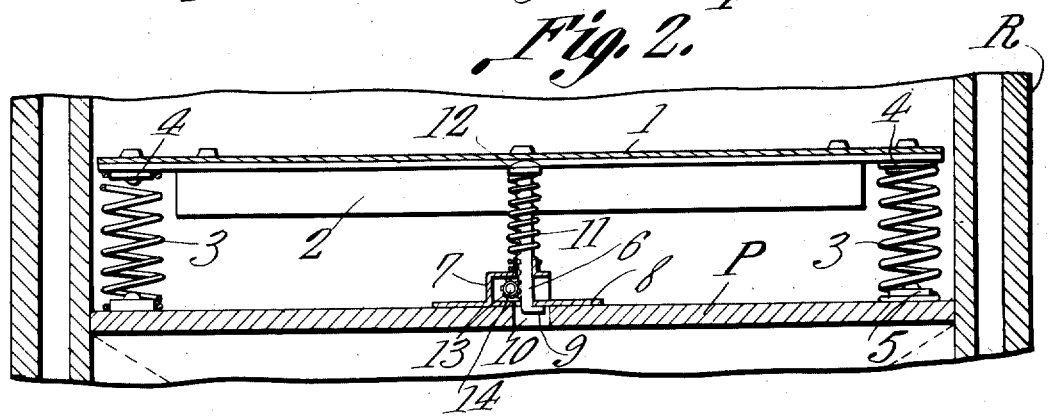
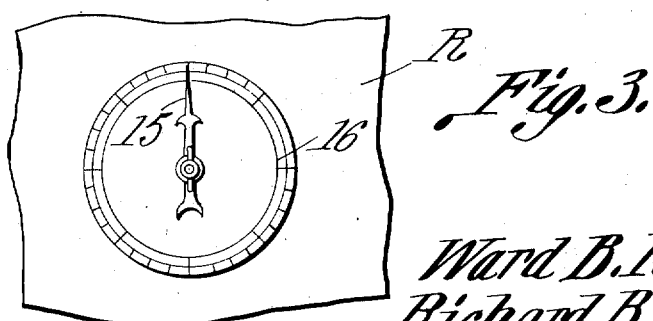

WARD B. ROWLAND AND RICHARD B. GROVER, OF PASADENA, CALIFORNIA.

WEIGHING DEVICE.

990,597.      Specification of Letters Patent.      Patented Apr. 25, 1911.

Application filed October 11, 1910. Serial No. 586,502.

*To all whom it may concern:*

Be it known that we, WARD B. ROWLAND and RICHARD B. GROVER, citizens of the United States, residing at Pasadena, in the county of Los Angeles, State of California, have invented a new and useful Weighing Device, of which the following is a specification.

This invention relates to weighing mechanism for refrigerators.

The object of the invention is to provide an apparatus of this character which shall be thoroughly accurate in indicating the quantity of ice contained within the refrigerator; which will operate under all conditions irrespective of the position occupied by the ice upon it, and which shall be thoroughly sanitary, and easy to remove for the purpose of cleansing the refrigerator.

With the above and other objects in view, as will appear as the nature of the invention is better understood, the same consists in the novel construction and combination of parts of a weighing mechanism for refrigerators, as will be hereinafter fully described and claimed.

In the accompanying drawing forming a part of this specification and in which like characters of reference indicate corresponding parts: Figure 1 is a view in elevation, partly in section, of the upper portion of a refrigerator, showing the improved mechanism therein. Fig. 2 is a view similar to Fig. 1 but viewed at right angles thereto. Fig. 3 is a fragmentary detail view showing the indicator.

Referring to the drawing, R indicates generally the upper portion of a refrigerator and I the ordinary ice rest, and as these parts may be of the usual or any preferred construction, detailed description thereof is deemed unnecessary.

Arranged within the ice chamber is the weighing mechanism which consists in part of a plate 1 longitudinally reinforced by L-shaped braces 2, which as shown in Fig. 2, extend nearly throughout the length of the plate. Interposed between the plate and the lower platform P are four coiled springs 3, the upper coils of which are sprung around washers 4 that are firmly riveted to the plate and the lower ends of which are sprung around bosses 5 rigid with the platform.

The registering mechanism comprises a rack bar 6 that works in a casing 7 secured to the lower platform and projects at its lower end through the base plate 8 of the casing, and is provided with a toe 9 to limit its upward movement, the lower platform being provided with an opening 10 to permit free movement of the bar. Surrounding the rack bar is a coiled spring 11, one end of which bears against the top of the casing 7 and its other end against a head or knob 12 carried by the bar. The bar is of such length that when the refrigerator is empty the knob contacts with the plate 1, and thus insures accurate weighing. Engaging the rack bar is a pinion 13 that is carried by the inner end of a rod 14 journaled in the casing 7, the outer end of the rod being projected through one wall of the refrigerator and being provided with a hand or pointer 15 to traverse a graduated dial 16 secured to the refrigerator.

As will be obvious, to insure proper operation of the device, all of the springs and the parts of the indicating mechanism must be made of a non-oxidizable metal, preferably brass to prevent rusting.

A very important feature of this invention resides in the fact that the rack bar is disconnected from the plate 1, so that the operation of the former will not be interfered with no matter how the ice is disposed upon the plate 1, and by this simple expedient, an objection heretofore present in apparatus of this character is completely overcome. Furthermore the plate 1 with the springs 3 may easily be removed when desired to cleanse the interior of the refrigerator, and thereby render the latter thoroughly sanitary.

What is claimed is:

A weighing device for refrigerators comprising a support, a spring sustained plate arranged above the support, a rack bar arranged beneath the plate and disconnected therefrom, means for maintaining one end of the rack bar in engagement with the plate, means for limiting the upward movement of the rack bar, a rod projecting through the casing of the refrigerator and carrying a hand or pointer, and a pinion carried by the other end of the rod and meshing with the rack bar.

In testimony that we claim the foregoing as our own, we have hereto affixed our signatures in the presence of two witnesses.

WARD B. ROWLAND.
RICHARD B. GROVER.

Witnesses:
EDUARD F. SHERMAN,
ELISHA D. W. SHEKELL.